United States Patent [19]

Arakawa et al.

[11] Patent Number: 4,701,229
[45] Date of Patent: Oct. 20, 1987

[54] METHOD OF HIGH FREQUENCY WELDING

[75] Inventors: Masaru Arakawa, Chigasaki; Masanori Numata, Hayamamachi, both of Japan

[73] Assignee: Nifco Inc., Yokohama, Japan

[21] Appl. No.: 832,031

[22] Filed: Feb. 19, 1986

[30] Foreign Application Priority Data

Feb. 21, 1985 [JP] Japan .................. 60-31417

[51] Int. Cl.⁴ .................. B29C 65/08; B65B 7/28
[52] U.S. Cl. .................. 156/69; 53/478; 156/73.1; 156/73.6; 156/309.6; 156/580.2; 220/67; 220/DIG. 14; 264/23; 264/248; 264/268; 264/320
[58] Field of Search .................. 156/69, 73.1, 580.2, 156/73.6, 309.6; 264/23, 268, 248, 320; 220/75, 67, DIG. 14; 53/478

[56] References Cited

U.S. PATENT DOCUMENTS

| 2,546,208 | 3/1951 | Barton | 156/69 |
| 2,588,604 | 3/1952 | Archer | 156/69 |
| 2,678,471 | 5/1954 | Barton | 264/320 |
| 3,824,138 | 7/1974 | Karobath et al. | 156/580.2 |
| 4,411,720 | 10/1983 | Sager | 156/69 |

Primary Examiner—Michael Wityshyn
Attorney, Agent, or Firm—Trexler, Bushnell, Giangiorgi & Blackstone, Ltd.

[57] ABSTRACT

A high frequency welding method comprises providing two plastic workpieces to be welded together with respective ribs which face each other, extend to the same height and have their surfaces opposite their facing surfaces inclined such that their thicknesses decrease toward their tops, and applying high frequency vibration to the ribs by positioning a high frequency welder horn such that the bottom of an annular groove of the horn having an arcuate sectional profile is pressed against the tops of the ribs.

1 Claim, 7 Drawing Figures

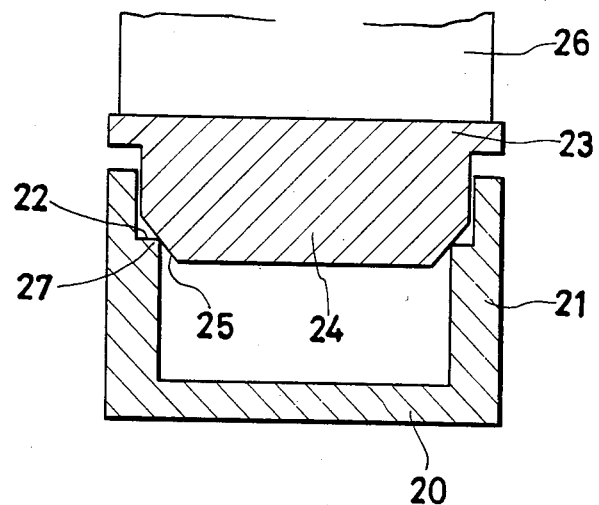
FIG_1 (PRIOR ART)
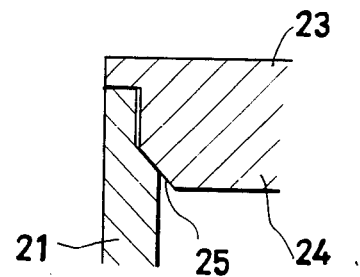
FIG_2 (PRIOR ART)

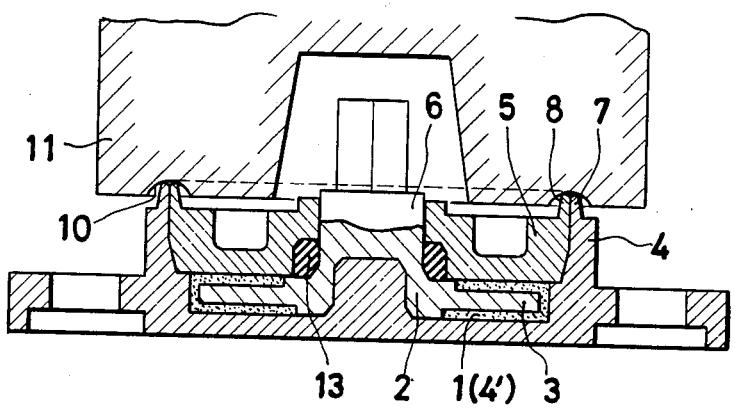
FIG_3
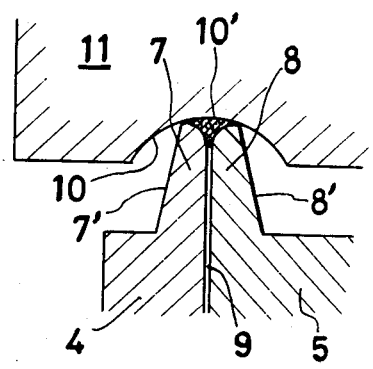
FIG_4
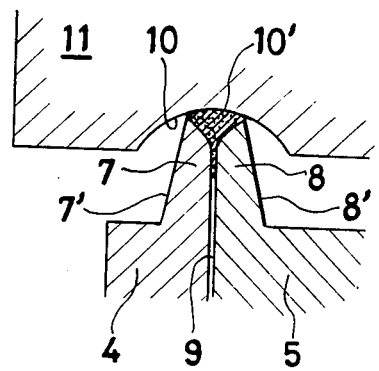
FIG_5
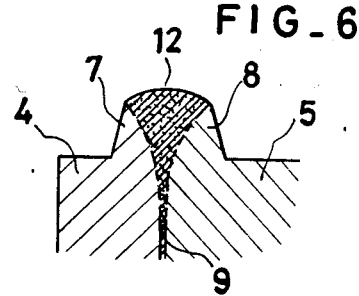
FIG_6
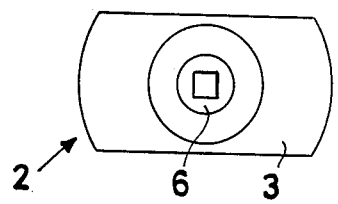
FIG_7

METHOD OF HIGH FREQUENCY WELDING

FIELD OF THE INVENTION AND RELATED ART STATEMENT

This invention relates to a method of high frequency welding, in which two plastic workpieces, e.g. a case and a lid of an oil type rotary damper accommodating a rotor which is braked by silicone oil, are welded to thereby effect the securement and sealing of the two workpieces simultaneously. More specifically, the invention concerns a method of high frequency welding which is particularly effective for high frequency welding of precision parts or small thickness workpieces, for which the welding conditions are comparatively stringent.

A prior art method of high frequency welding will now be described in conjunction with the case of welding together a case and a lid with reference to FIG. 1. In this case, a shoulder 22 formed in an upper portion of the inner surface of a wall 21 of a case 20 and a lid 23 having an engagement portion 24 engaging with the shoulder 22 are welded together. In this case the lower end of the engagement portion 24 is chamfered to form an inclined surface 25. The inclined surface 25 is urged against a corner 27 of the shoulder 22 by pressing the lid 23 from above with a high frequency welder horn 26, the lower surface of which is in contact with the lid 23.

In the prior art process, the high frequency welder horn 26 vibrates the top of the lid 23. The vibration is transmitted through the lid to the inclined surface 25 and the corner 27 of the shoulder 22, which are in contact with each other. In other words, the vibration from the horn 26 is not directly transmitted to the portion to be welded (i.e., the corner 27). Therefore, the welder conditions are inevitably stringent because vigorous vibration has to be transmitted. In addition, other portions than the portions to be welded together are liable to be adversely affected by the vigorous vibration.

Further, what is actually melted is the corner 27 of the shoulder 22 of the case, and the inclined surface 25 of the lid is melted only very slightly. Therefore, there may occur a portion where the lid and the case are not perfectly welded together, that is, there may occur an imperfect seal.

OBJECT AND SUMMARY OF THE INVENTION

An object of the invention is to provide a method of high frequency welding which is free from the occurrence of welding irregularities and can provide a very strong and perfect seal effect.

To attain the above object of the invention, there is provided a method of high frequency welding which comprises the steps of providing two plastic workpieces to be welded together with respective ribs facing each other and extending to the same height, the surfaces of the ribs opposite the facing surfaces being inclined such that their thicknesses decrease toward their tops, and applying high frequency vibration to the ribs by positioning a high frequency welder horn such that the bottom of an annular groove of the horn having an arcuate sectional profile is pressed against the tops of the ribs.

According to the invention, the two plastic workpieces to be welded together are provided with respective ribs, and high frequency vibration is directly applied to the ribs which are disposed such that they face each other.

The top portions of the ribs are thus melted by vibration directly applied from the horn. In addition, the ribs are urged toward each other due to the arcuate sectional profile of the annular groove of the horn and the inclination of the surfaces of the ribs opposite the surfaces facing each other. The melted portion cannot spread toward the back side of the ribs, so that it flows into the gap between the ribs and solidifies there, thus integrally bonding the ribs. The ribs thus can be reliably welded and sealed together.

The above and further objects and features of the invention will become more apparent from the detailed description with reference to the accompanying drawings.

BRIEF DESCRIPTION OF THE DRAWINGS

FIG. 1 is a view for explaining the welding of a case and a lid by a prior art high frequency welding process;

FIG. 2 is a sectional view showing a weld obtained by the method shown in FIG. 1;

FIG. 3 is a view showing the welding of a case and a lid of a rotary damper by the method of high frequency welding according to the invention;

FIG. 4 is a sectional view showing the start of welding by the method shown in FIG. 3;

FIG. 5 is a sectional view showing an intermediate stage of the welding;

FIG. 6 is a sectional view showing the completed weld; and

FIG. 7 is a plan view showing the rotor of the rotary damper shown in FIG. 3.

DESCRIPTION OF THE PREFERRED EMBODIMENT

Referring to FIGS. 3 to 7, in the illustrated embodiment, grease 1, e.g., silicone oil and a control plate 3 of a rotor 2 rotating in the grease 1 are accommodated in a housing 4' of a case 4. In this oil type rotary damper, a brake plate 3 rotated by torque transmitted to the shaft of the rotor 2 is braked by the viscosity of the grease 1. The case 4 and a lid 5 are welded together. The case 1 has a lid receiving section, which is provided above and has a greater diameter than the inner diameter of the housing 4'. The lid 5 is snugly fitted in the lid receiving section. The rotor 2 has a shaft 6 having the brake plate 3. The lower end of the shaft 6 is positioned at the center of the bottom of the housing 4'. The shaft 6 passes through a central circular hole of the lid 5, and a driven gear meshing with a rack or a gear is secured to the top of the shaft 6.

The edge portion of the lower surface of the lid 5 is received in the bottom of the lid receiving section of the case 4.

The case 4 has a cylindrical rib 7 projecting from its top and continuous with the inner periphery of the lid receiving section. The lid 5 has a similar cylindrical rib 8 projecting from its top and continuous with the outer periphery thereof. With the lid 5 set in the lid receiving section of the case 4, the inner periphery of the cylindrical rib 7 of the case and the outer periphery of cylindrical rib 8 face each other across a slight gap as shown in FIGS. 4 to 6. The top of the cylindrical ribs 7 and 8 have the same level, and their surfaces 7' and 8' opposite their facing surfaces are inclined such that the thicknesses of the ribs 7 and 8 decrease upwardly.

The cylindrical ribs 7 and 8 are subjected to high frequency vibration by positioning a high frequency welder horn 11 such that the bottom of an annular groove 10, which is formed in the bottom surface of the horn 11 and having an arcuate sectional profile, is pressed against the top of the ribs 7 and 8. In consequence, the top portions of the ribs 7 and 8, to which vibration is applied directly from the horn 11, start to be melted (FIG. 4). As the melting proceeds, the height of the ribs is progressively reduced. The ribs are urged toward each other due to the arcuate sectional profile of the annular groove 10 of the horn 11 and the inclination of the surfaces 7' and 8' of the ribs. The melted portion, however, cannot spread to the back side of the ribs, so that it flows into a gap 9 between the opposed ribs (FIG. 5). When the height of both the ribs has been reduced to a certain extent, the horn 11 is separated therefrom. The welded section 12 is thus formed between the case and lid as a result of the solidification of the melted portion. Grease thus can be prevented from leaking through between the case and the lid.

The leakage of the grease along the shaft 6 is prevented by an O-ring 13, which is fitted on the shaft 6 and received in an increased diameter portion of the hole of the lid such that it is radially compressed by the peripheral wall of the increased diameter portion.

According to the invention the horn 11 is held in close contact with the top of the ribs 7 and 8 of both workpieces (i.e., the case and the lid) which are to be welded together, for direct transmission of high frequency vibration. Thus, the top portions of both the ribs can be melted in equal quantities even under a welder condition requiring not vigorous but weak high frequency vibration. Therefore, there is no possibility of other portions undergoing adverse effects, such as production of affected zones, by the high frequency vibration. Further, since the two top portions are melted in equal quantities and integrated, no variation in weld quality will occur, and it is possible to obtain a weld providing a very powerful and perfect seal effect.

What is claimed is:

1. A method of high frequency welding comprising the steps of: providing two plastic workpieces to be welded together with concentric axially upstanding respective ribs having lateral annular surfaces facing each other and extending to the same height, each rib having a top, said ribs having outer surfaces opposite the facing surfaces which are inclined such that the thicknesses of said ribs decrease toward their tops; and applying high frequency vibration to said ribs by positioning a high frequency welder horn such that the bottom of an annular groove of said horn having an arcuate sectional profile is pressed axially against the tops of said ribs to melt said ribs at and adjacent said tops and to centralize the melted material over said facing surfaces, said ribs of the two plastic workpieces being disposed such that a slight gap is formed between their facing surfaces and the melted material, due to said arcuate sectional profile of said annular groove and the inclination of said outer surfaces, does not spread to said outer surfaces of said ribs and is pressed between said facing surfaces.

* * * * *